United States Patent [19]

Layh

[11] Patent Number: 5,365,144
[45] Date of Patent: Nov. 15, 1994

[54] ELECTRICAL POWER SUPPLY UNIT FOR THE SUPPLY OF LOW POWER LOADS

[75] Inventor: Hans-Dieter Layh, Anna Maria, Fla.

[73] Assignee: Technology Services, Inc., Anna Maria, Fla.

[21] Appl. No.: 73,437

[22] Filed: Jun. 9, 1993

[30] Foreign Application Priority Data

Jun. 10, 1992 [DE] Germany .................. 4218968

[51] Int. Cl.⁵ .................................. H01J 7/44
[52] U.S. Cl. ........................ 315/58; 315/57; 363/146
[58] Field of Search ............. 315/58, 62, 59, 57; 361/523, 535, 434; 363/146

[56] References Cited

U.S. PATENT DOCUMENTS

| 4,891,558 | 1/1990 | Tschuk | 315/58 X |
| 5,097,404 | 3/1992 | Layh | 363/146 |

FOREIGN PATENT DOCUMENTS

0346782A1 12/1989 European Pat. Off. .
838347 7/1949 Germany .
3-248522 11/1991 Japan ..................... 361/535
3-261123 11/1991 Japan ..................... 361/535

OTHER PUBLICATIONS

Fluorescent Lamp Ballasts and Circuits for Low-Voltage Discharge Lamps; by Dr. -Ing. C. H. Sturm; brochure published by Brown, Boveri & Cie Aktiengesellschaft Manheim.

Primary Examiner—Robert J. Pascal
Assistant Examiner—Haissa Philogene
Attorney, Agent, or Firm—Evenson, McKeown, Edwards & Lenahan

[57] ABSTRACT

An electrical power supply unit for the supply of low power loads is provided with a capacitor constructed in the form of a flat piece, having a large cross-section and a small height perpendicular to the plane of the large cross-section. This provides a particularly compact construction, in particular when the capacitor and a transformer or choke coil arrangement are accommodated in a common housing, which also enables a correspondingly compact illuminating lamp to be realized.

11 Claims, 3 Drawing Sheets

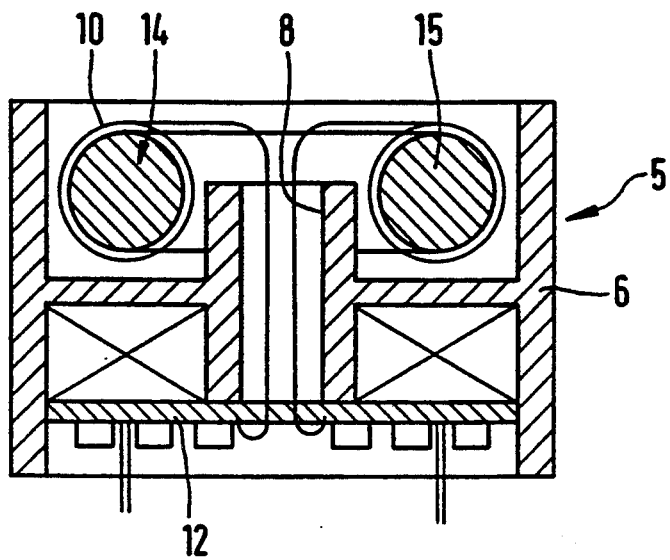
Fig. 6
Fig. 7 "A"
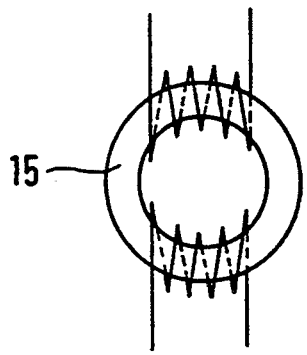
Fig. 7 "B"
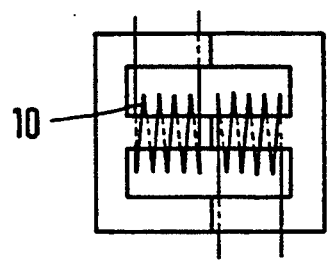
Fig. 7 "C"
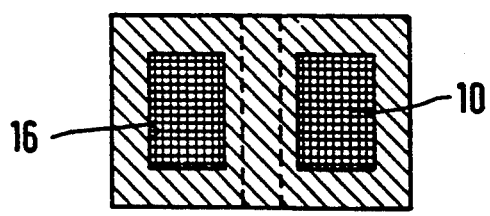
Fig. 8
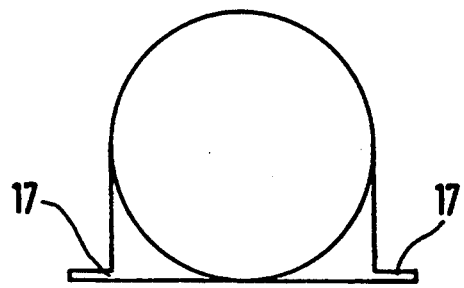

ELECTRICAL POWER SUPPLY UNIT FOR THE SUPPLY OF LOW POWER LOADS

BACKGROUND AND SUMMARY OF THE INVENTION

The invention relates to a power supply unit for the supply of low power loads, in particular low voltage loads such as, for example, fluorescent lamps having a screw base, comprising input-side power connections and output-side load connections as well as a capacitor arrangement of large capacitance, in particular an electrolytic capacitor arrangement.

Screw base fluorescent lamps are nowadays widely used, because they require substantially less energy for comparable illuminating power in comparison to conventional filament lamps. Due to the screw base, an exchange of the filament lamps with such fluorescent lamps is in principal easily possible.

However, the exchange is often not possible due to the fact that the space requirement for screw base fluorescent lamps is very large in comparison to the conventional screw base filament lamps, especially in the region near the screw base. This stems from the fact that conventional screw base fluorescent lamps possess power supply units of comparably large volume, which must be accommodated in housings of corresponding large dimensions adjoined to the screw base.

An object of the present invention is to provide an electrical power supply unit that has a particularly small spatial requirement and, for application in screw base fluorescent lamps, offers the possibility of constructing these lamps in a substantially more space-saving manner so that the substitution of conventional screw base filament lamps with screw base fluorescent lamps is made substantially easier.

This and other objects are achieved by the present invention which provides a power supply unit for the supply of low voltage loads for fluorescent lamps, comprising a screw base, input-side power connections and output-side load connections, and an electrolytic capacitor arrangement of large capacitance. The capacitor arrangement is relatively flat and has a relatively large cross-section and a relatively small height perpendicular to a plane of the large cross-section.

The present invention recognizes that the spatial requirement of a power supply unit of the initially described kind is influenced to a high degree by the capacitor arrangement used. Whereas in conventional power supply units standard capacitors are typically used which have height, width, and length dimensions of a similar order of magnitude, the present invention employs capacitors having a particular construction, i.e. capacitors which are constructed in the manner of a flat piece. This offers the advantage that the flat piece forming the capacitor can also serve as a supporting or co-supporting part for the other components of the electrical power supply, whereby a particularly compact construction is made possible.

Additionally, the cross-section of the capacitor arrangement constructed as a flat piece can be tailored to the form of the available accommodating space. For the example of a screw base fluorescent lamp, the cross-section of the flat piece-shaped capacitor arrangement can then be tailored to the cross-section of the screw base or to the base area of the holder for the fluorescent lamp parts. Thereby, a particularly compact screw base fluorescent lamp can be realized, as is shown further below.

In accordance with a preferred embodiment of the invention, the capacitor arrangements can comprise layered electrodes, having electrode surfaces which are substantially parallel to the plane of the cross-section. This construction offers the advantage that there exist practically no limitations with regard to the form of the capacitor arrangement's cross-section and correspondingly, a particularly good matching to the relevant conditions in use is possible.

In certain embodiments, a capacitor arrangement is used having wound electrodes, wherein the electrode surfaces are disposed substantially perpendicular to the plane of the cross-section of the flat piece-like capacitor arrangement.

In certain embodiments, the power supply unit will also comprise a transformer or choke coil arrangement. The windings of the transformer or choke coil arrangement are accommodated as well as the capacitor arrangement in a common housing constructed from several pieces. In certain embodiments, the transformer or choke coil arrangement is disposed in approximately the same plane as the capacitor arrangement.

However, it is also possible and advantageous to provide the windings of the transformer or choke coil arrangement at an end face of the capacitor arrangement.

By accommodating the transformer or choke coil arrangement as well as the capacitor arrangement in a common housing, a module is created unifying the large parts of the power supply unit, so that a very compact manner of construction is possible.

Certain embodiments of the invention provide the housing with an axial channel which is approximately perpendicular to the large cross-section of the flat piece-like capacitor arrangement, this axial channel traversing the housing from one end face to the other end face.

With the tubular axial channel, by means of which the housing obtains a ring-like structure, it is taken into account that the power supply unit of screw base fluorescent lamps is expediently disposed spatially and axially between the screw base and the light-producing lamp parts and must therefore be electrically connected both to the screw base and to the light-producing lamp parts. The corresponding wiring can be laid in the axial channel. This also applies to the electrical connections between the transformer or choke coil arrangement and the capacitor arrangement as well as further electronic components of the power supply unit.

The parts of the capacitor arrangement housing can be optionally manufactured from magnetizable material, in particular ferromagnetic material, in order to create additional electrical inductance in the electrical power supply, as is desired for many types of applications. In this manner, the capacitor arrangement housing also adopts the function of an electrical or electronic component.

Other objects, advantages and novel features of the present invention will become apparent from the following detailed description of the invention when considered in conjunction with the accompanying drawings.

BRIEF DESCRIPTION OF THE DRAWINGS

FIG. 6 illustrates another embodiment of the present invention in which the housing is partly open in the region of the transformer or choke coil arrangement.

FIGS. 7A-C illustrate various embodiments of the transformer.

FIG. 8 is a schematic side view of a power supply unit constructed with another embodiment of the present invention.

DETAILED DESCRIPTION OF THE DRAWINGS

Figure 1:
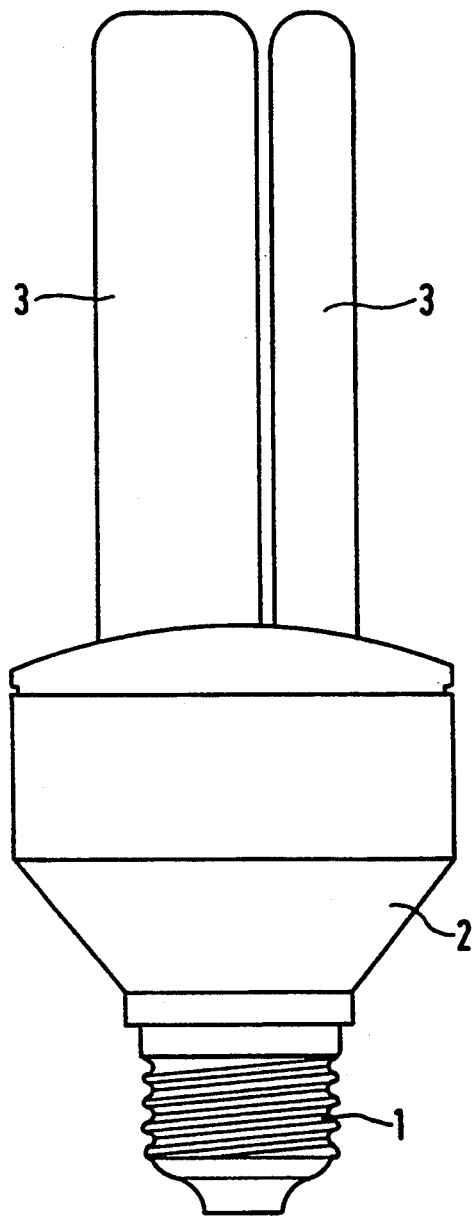
FIG. 1 illustrates a conventional screw base fluorescent lamp.

The prior art fluorescent lamp shown in FIG. 1 possesses a conventional screw base 1, as is known from conventional filament lamps, a lamp housing 2 adjoining thereto, which accommodates a power supply unit which is not shown in detail, as well as normally tubular light-producing lamp parts 3 mounted to the end face of the lamp housing 2. The lamp housing 2 possesses an extraordinarily large cross-section because the power supply unit accommodated therein has a corresponding spatial requirement. As a result, the fluorescent lamp shown in FIG. 1 is often unsuited to be employed as a substitute for conventional filament lamps. The glass bulbs of conventional filament lamps normally have a very small cross-section in the neighborhood of the screw base, and the accompanying lights are often tailored to this form of the glass bulb of the filament lamps, i.e. there is only a little space available in the lamp near to the screw base.

Figure 2:
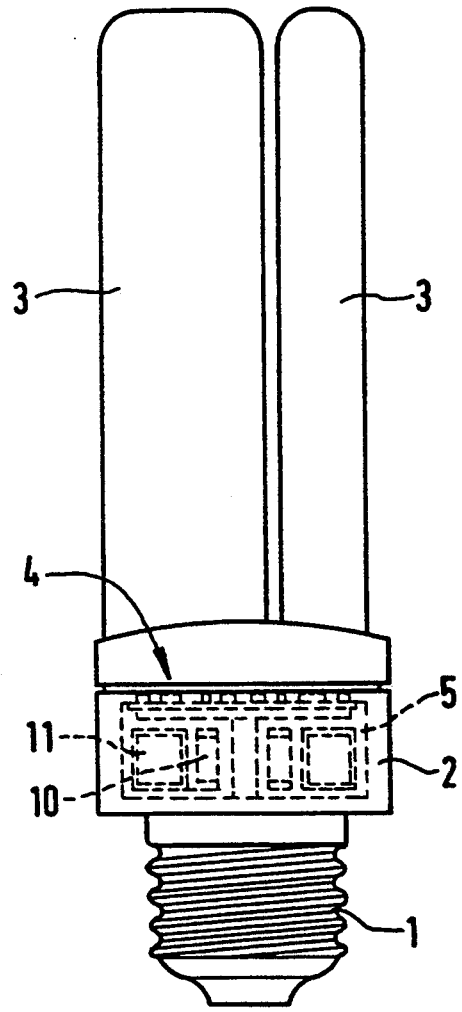
FIG. 2 shows a fluorescent lamp having a power supply unit constructed in accordance with an embodiment of the present invention.

The fluorescent lamp of the present invention shown in FIG. 2 is characterized by a substantially more compact construction, because here a power supply unit 4 constructed according to the invention is used, which makes a very small lamp housing 2 possible.

It is thereby achieved that the fluorescent lamp shown in FIG. 2 is better suited as a substitute for conventional filament lamps.

Figure 3:
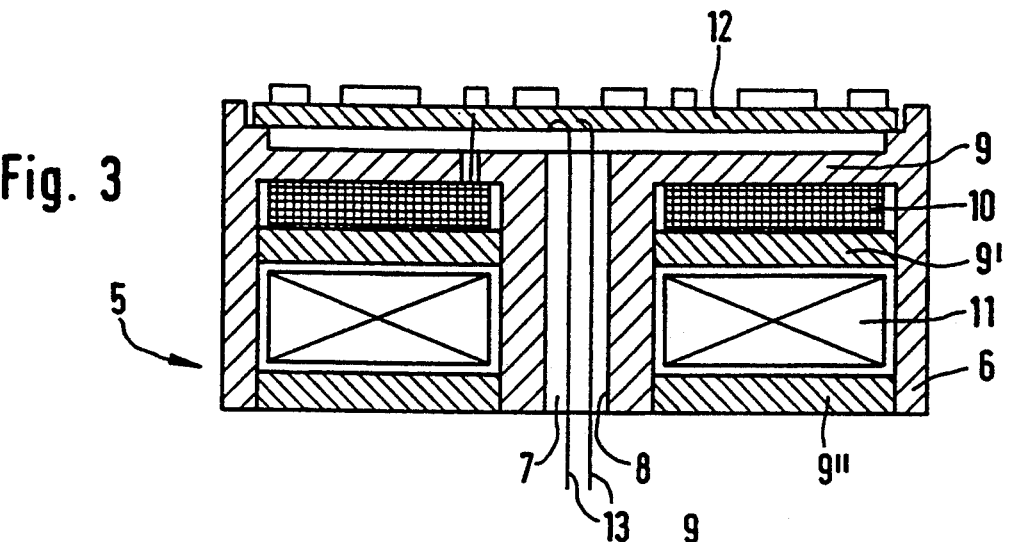
FIG. 3 is an enlarged axial section of an embodiment of a power supply unit in accordance with the present invention, where the windings of the transformer or choke coil arrangement and the electrolytic capacitor arrangement are disposed axially above one another.

The power supply unit 4 shown to scale in FIG. 2 is shown enlarged in FIG. 3. The power supply unit 4 possesses a housing 5, comprising an outer peripheral wall 6 which has a circular cross-section, as well as an inner peripheral wall 8 forming a central axial channel 7, and a multiplicity of annular disk-shaped floors 9 to 9‴ disposed between the outer peripheral wall 6 and the inner peripheral wall 8, these floors forming two axially adjacent annular chambers inside the housing 5.

The windings 10 of a transformer are accommodated in the annular chamber which is narrower in its axial direction, whereas the other larger annular chamber accommodates an electrolytic capacitor arrangement 11, which is either wound radially with respect to the axis of the axial channel 7 or has an axially layered construction.

The outer peripheral wall 6 as well as the inner peripheral wall 8 and one of the floors 9 to 9‴ can form a singly pieced (integral) housing part. Both the other floors, the floors 9′ and 9″ in the example shown, form separate parts which are arranged in or at the integral housing part after installation of the windings 10 or the electrolytic capacitor arrangement 11 respectively.

At least the parts of the housing 5 which completely surround the windings 10 are made from magnetizable, or in particular ferromagnetic material, whereas for the containment of the electrolytic capacitor arrangement 11 other materials are also suitable in principle. However, in the example shown, the electrolytic capacitor arrangement 11 is also surrounded by magnetizable material. An additional electrical inductance is thereby created and a corresponding separate component for the power supply unit 4 made superfluous.

A circuit board 12 is arranged on the upper end face of the housing 5 in FIG. 3, the circuit board 12 having further electronic components required for the power supply unit 4. For holding this circuit board 12, the outer peripheral wall 6 is extended, in FIG. 3 upwards, beyond and over the floor 9 so that a ring-shaped shoulder is formed which surrounds the outer edge of the circuit board 12.

In the example shown, connecting wires 13 are disposed in the axial chamber 7 via which components on the circuit board 12 are electrically connected to the screw base 1 (see FIG. 2). Additionally, the axial channel 7 can serve to take up further wires (not shown), which connect elements of the circuit board 12 to the windings 10 of the transformer or alternatively to the electrolytic capacitor arrangement 11. For these wires corresponding channels are arranged as electrical feedthrough on or in the floors 9 to 9‴ or in the inner peripheral wall 8.

Figure 4:
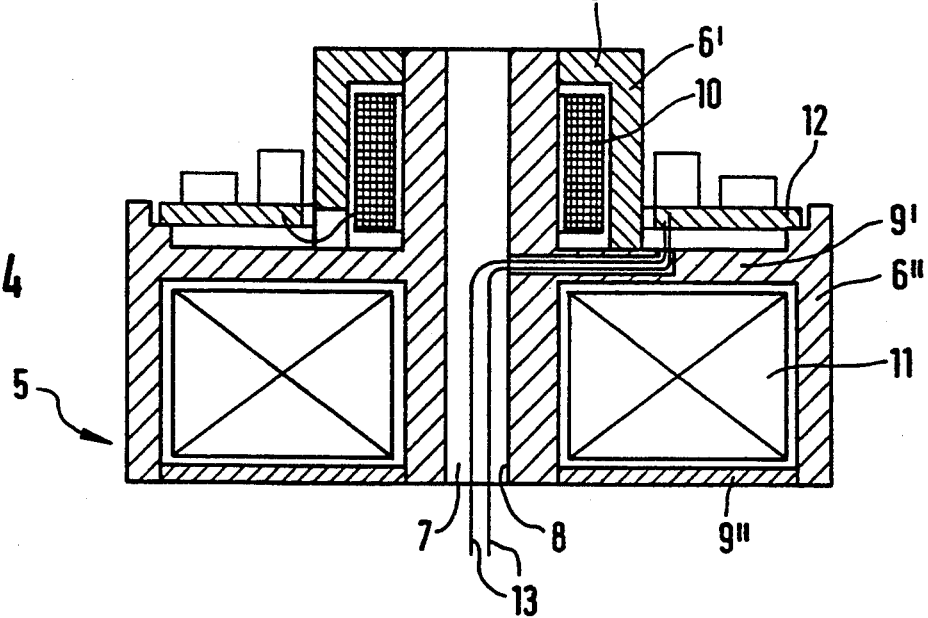
FIG. 4 shows a power supply unit constructed in accordance with another embodiment of the present invention.

The embodiment shown in FIG. 4 differs from the embodiment of FIG. 3 substantially in that the windings 10 of the transformer are accommodated in an annular or toroidal chamber which, in comparison to the embodiment of FIG. 3, has a larger axial length and considerably reduced radial cross-section. Correspondingly, the inner peripheral wall 8 forming the axial channel 7 is axially lengthened, whereas the outer peripheral wall has two cylindrical sections 6′ and 6″ of different diameters of such a type that a ring step is formed upon which a annular disk-shaped circuit board 12 is arranged.

In the embodiment shown in FIG. 4, the section 6′ of the outer peripheral wall forms, together with the upper housing floor 9, a one-piece housing part, which can be axially slid onto a further one-piece housing part formed from the inner peripheral wall 8, the floor 9′ as well as the section 6″ of the outer peripheral wall.

Figure 5:
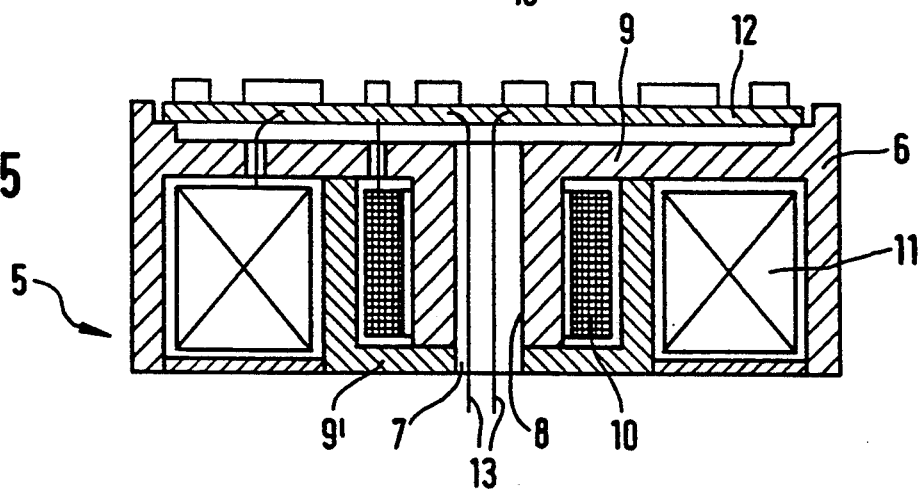
FIG. 5 shows an embodiment of the present invention in which the windings of the transformer or choke coil arrangement and the electrolytic capacitor arrangement are disposed radially with respect to one another and in approximately the same plane.

In the embodiment shown in FIG. 5, the housing 5 possesses two annular or toroidal chambers disposed radially above one another, wherein the windings 10 of the transformer are accommodated in the radially inner annular chamber, which possesses a comparably smaller cross-section. In certain embodiments of the invention, however, the windings 10 are accommodated in the radially outer annular chamber.

In FIG. 5, the housing 5 is once more constructed from several parts, wherein the upper floor 9 as well as the inner peripheral wall 8 and the outer peripheral wall 6 form a first singly pieced housing part. The radially inner region of the lower floor 9′ is combined with the ring-shaped dividing wall between the annular chambers for the windings 10 or the electrolytic capacitor arrangement 11 into a further singly pieced housing part. A ring-disk forming the radially outer region of the lower floor 9', serves to close off the annular chamber accommodating the electrolytic capacitor arrangement 11.

With regard to the materials of the elements of the housings 5, the same applies, in principle, for the embodiments of FIGS. 4 and 5 as for the embodiments of FIG. 3.

In the embodiment shown in FIG. 6, the outer peripheral wall 6 as well as the inner peripheral wall 8 are axially extended, (in the drawing upwards), in such a way that a annular channel open at the end face is formed on, what is in the drawing, the upper end face of the housing. This annular channel serves for the accommodation of a transformer 14, the windings 10 of which are arranged in the example shown on an annular or toroidal core 15.

The circuit board 12 comprising further electronic components of the power supply unit is disposed on the end face of the housing 5 facing away from the transformer 14, wherein the edge of the circuit board 12 is surrounded similarly as in the embodiments of FIG. 5 by an annular web-like extension of the outer peripheral wall 6 of the housing 5.

FIG. 7 shows various embodiments of a transformer suited for the power supply unit of the invention. In FIG. 7A, a transformer with an annular or toroidal core 15 is shown.

In FIG. 7B the transformer possesses a so-called E-core, which can be optionally formed from two E-shaped pieces combined in the manner shown in FIG. 7B. There, the transformer windings 10 are arranged on the central bar of the E-shape.

In FIG. 7C, a transformer having a cup-core is shown. Here, the windings 10 of the transformer are accommodated in an annular space 16 of a housing forming the cup-core. Therefore, this embodiment of the transformer corresponds in principal to the transformer arrangements shown in FIGS. 3 to 5. Optionally, an axial channel, shown dotted in FIG. 7C, corresponding to the axial channel 7 of the embodiments of FIGS. 3 to 5, can be arranged in the central region of the cup-core.

In accordance with FIG. 8, angled lugs 17 can be arranged or formed on the outer wall of the housing of the power supply unit, with which the power supply unit can be secured to, in principal, an unlimited number of carrying parts.

The adjoining extensions (not shown) at the outer peripheral wall 6 or at the inner peripheral wall 8 of the embodiments shown in FIGS. 3 to 5 can optionally also serve the same purpose.

What is claimed:

1. Power supply unit for the supply of low voltage loads, comprising:
   input-side power connections and output-side load connections;
   an electrolytic capacitor having a large capacitance;
   one of a transformer and choke-coil;
   a housing in which said capacitor and said one of the transformer and choke-coil are arranged, said housing having a substantially disk-shape in which ring-shaped chambers are arranged;
   wherein said capacitor and said one of said transformer and choke-coil have a ring-shaped construction and are separately housed in said ring-shaped chambers arranged coaxially with respect to one another.

2. Power supply unit as set forth in claim 1, wherein the capacitor has layered electrodes, said electrodes having electrode surfaces which are substantially parallel to the plane of said large cross-section.

3. Power supply unit as set forth in claim 1, wherein the capacitor has wound electrodes, said electrodes having electrode surfaces which are substantially perpendicular to the plane of said large cross-section.

4. Power supply unit as set forth in claim 1, wherein at least one of a transformer and a choke coil is disposed in approximately the same plane as the capacitor arrangement.

5. Power supply unit as set forth in claim 1, wherein at least one of a transformer and a choke coil is disposed on an end face of the capacitor.

6. Power supply unit as set forth in claim 1, further wherein the housing has a tubular axial channel extending approximately perpendicular to the plane of said large cross-section, said channel traversing the housing from one end face to another end face of the housing.

7. Power supply unit as set forth in claim 6, wherein the housing includes an inner peripheral wall, and the axial channel is surrounded by the inner peripheral wall of the housing.

8. Power supply unit as set forth in claim 4, further wherein the ring chamber having walls are made of at least one of magnetizable and ferromagnetic material and surrounding the windings.

9. Power supply unit as set forth in claim 1, further comprising a chamber in which the capacitor is accommodated, the chamber having walls which enclose the capacitor, and wherein at least some regions of these walls are made of magnetizable material.

10. Power supply unit as set forth in claim 9, wherein the walls of the chamber which accommodates the capacitor are made entirely from magnetizable material, and wherein at least some regions of this magnetizable material are made of ferromagnetic material.

11. Power supply unit as set forth in claim 1, being said housing is a part of a fluorescent lamp having a screw base, said screw base being electrically connected to the input-side power connections.

* * * * *